(12) United States Patent
Lee et al.

(10) Patent No.: US 9,489,574 B2
(45) Date of Patent: Nov. 8, 2016

(54) APPARATUS AND METHOD FOR ENHANCING USER RECOGNITION

(71) Applicant: KYUNGPOOK NATIONAL UNIVERSITY INDUSTRY-ACADEMIC COOPERATION FOUNDATION, Daegu (KR)

(72) Inventors: Minho Lee, Daegu (KR); Ho-Wan Kwak, Daegu (KR); Young-Min Jang, Gyeongsangbuk-do (KR); Byunghun Hwang, Daegu (KR); Sangil Lee, Daegu (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 63 days.

(21) Appl. No.: 14/363,203

(22) PCT Filed: Nov. 26, 2012

(86) PCT No.: PCT/KR2012/010025
§ 371 (c)(1),
(2) Date: Jun. 5, 2014

(87) PCT Pub. No.: WO2013/085193
PCT Pub. Date: Jun. 13, 2013

(65) Prior Publication Data
US 2014/0341473 A1 Nov. 20, 2014

(30) Foreign Application Priority Data

Dec. 6, 2011 (KR) .................. 10-2011-0129934
Dec. 6, 2011 (KR) .................. 10-2011-0129936
Oct. 9, 2012 (KR) .................. 10-2012-0112031

(51) Int. Cl.
| | |
|---|---|
| *G06K 9/46* | (2006.01) |
| *G06K 9/00* | (2006.01) |
| *G06F 3/01* | (2006.01) |

(52) U.S. Cl.
CPC .......... *G06K 9/00597* (2013.01); *G06F 3/011* (2013.01); *G06K 9/0061* (2013.01); *G06K 9/00268* (2013.01); *G06K 9/00335* (2013.01)

(58) Field of Classification Search
None
See application file for complete search history.

(56) References Cited

U.S. PATENT DOCUMENTS

| | | | | |
|---|---|---|---|---|
| 7,206,022 B2 * | 4/2007 | Miller | ................ | G02B 27/0093 348/231.3 |
| 8,136,944 B2 * | 3/2012 | De Lemos | ............. | A61B 3/113 351/209 |

(Continued)

FOREIGN PATENT DOCUMENTS

| | | |
|---|---|---|
| JP | 2010-057710 | 3/2010 |
| KR | 1020010097898 A | 11/2001 |
| KR | 1020100021702 A | 2/2010 |

OTHER PUBLICATIONS

International Search Report dated Feb. 13, 2013 corresponding to PCT/KR2012/010025, 2 pp.

(Continued)

*Primary Examiner* — Daniel Mariam
(74) *Attorney, Agent, or Firm* — Ohlandt, Greeley, Ruggiero & Perle, LLP

(57) ABSTRACT

Disclosed is an apparatus for enhancing user recognition. The apparatus for enhancing user recognition comprises: a storage unit for storing content; a display unit for displaying the stored content; a scan path detection unit for detecting a scan path of a user on the content; an eye feature extraction unit for extracting eye feature information from the detected scan path; and a calculation unit for calculating a recognition state of the user for the content by using the extracted eye feature information.

33 Claims, 16 Drawing Sheets

(56) References Cited

U.S. PATENT DOCUMENTS

| | | | |
|---|---|---|---|
| 8,830,164 B2* | 9/2014 | Sakata | G06F 3/013 |
| | | | 345/156 |
| 9,039,419 B2* | 5/2015 | Dietrich | G09B 7/00 |
| | | | 434/236 |
| 2010/0016730 A1* | 1/2010 | Tanaka | A61B 3/024 |
| | | | 600/476 |
| 2011/0141011 A1* | 6/2011 | Lashina | G06F 3/013 |
| | | | 345/156 |
| 2011/0175932 A1* | 7/2011 | Yu | G06F 3/048 |
| | | | 345/661 |

OTHER PUBLICATIONS

Ju, et al., "Development of Integrated Analysis Model and Tool for Web Usability Test with Emphasis on Eye-Tracking, Mouse-Tracking, and Retrospective Think Aloud", Korean Society of Design Science. 73rd Published, vol. 20, No. 5, May 31, 2007, 12 pp.

* cited by examiner we may miss some important information in a fast-changing world

APPARATUS AND METHOD FOR ENHANCING USER RECOGNITION

TECHNICAL FIELD

Apparatuses and methods consistent with the present invention relate to an apparatus and method for enhancing user recognition, and more particularly, an apparatus and method for enhancing user recognition for analyzing user scan-path and behavior pattern to analyze a user recognition state.

BACKGROUND ART

Recently, a main research issue in intention modeling and recognition is to generate a new paradigm in a human computer interface (HCI) and a human-robot interaction (HRI).

The numerous amount of information is provided to users in a life environment. Since the numerous amount of information is provided to users, a user is not frequently capable of recognizing important changing information. A phenomenon whereby it is difficult to detect change in a screen is referred to as change blindness.

Accordingly, there is a need for a method of easily providing changing information to a user.

In addition, recently, various computer-based learning tools have been developed. However, conventional learning tools are capable of simply providing content based on learning results of a user but are not capable of recognizing user concentrativeness and learning capability during a learning process.

Thus, there has been a need to develop a method and learning tool for analyzing a user recognition state such as user concentrativeness, interest, learning state, etc. during a learning process.

DISCLOSURE

Technical Problem

The present invention provides an apparatus and method for enhancing user recognition, which recognize important changing information, which is thoughtlessly missed by users, and provide the information to the users by analyzing a user scan-path.

The present invention also provides an apparatus and method for enhancing user recognition for analyzing user scan-path and behavior pattern with respect to learning content to analyze a user recognition state such as user concentrativeness, interest, learning state, etc.

Technical Solution

According to an aspect of the present invention, a user recognition enhancing apparatus includes a storage configured to store content, a display configured to display the stored content, a gaze pattern detector configured to detect a gaze pattern of a user with respect to the content, a gaze feature extractor configured to extract gaze feature information from the detected gaze pattern, and a calculator configured to calculate a recognition state of the user with respect to the content using the extracted gaze feature information.

The gaze feature information may include at least one piece of information of user pupil change, eye blinking, a gaze point, a path of a gaze point, time when a gaze falls on a specific area of learning content, and the number of times a gaze falls on the specific area.

The calculator may analyze a correlation between a predefined gaze pattern about the content and the detected gaze pattern to calculate the recognition state of the user with respect to the content.

The predefined gaze pattern may be a defined pattern associated with reading capability.

The calculator may calculate the recognition state of the user with respect to the content based on time when a gaze falls on a specific area of content of a detected scan-path and the number of times a gaze falls on the specific area.

The content may be learning content.

According to another aspect of the present invention, a user recognition enhancing method of a user recognition enhancing apparatus includes displaying pre-stored content, detecting gaze pattern of a user with respect to the content, extracting gaze feature information from a detected scan-path, and calculating a recognition state of the user with respect to the content using the extracted gaze feature information.

The gaze feature information may include at least one piece of information of user pupil change, eye blinking, a gaze point, a path of a gaze point, time when a gaze falls on a specific area of learning content, and the number of times a gaze falls on the specific area.

The calculating may include analyzing a correlation between a predefined gaze pattern about the content and the detected gaze pattern to calculate the recognition state of the user with respect to the content.

The predefined gaze pattern may be a defined pattern associated with reading capability.

The calculating may include calculating the recognition state of the user with respect to the content based on time when a gaze falls on a specific area of content of a detected scan-path and the number of times a gaze falls on the specific area.

The content may be learning content.

According to another aspect of the present invention, a user recognition enhancing apparatus includes a storage configured to store content, a display configured to display the stored content, a gaze feature information acquirer configured to acquire gaze feature information of a user with respect to the content, a behavior feature information acquirer configured to acquire behavior feature information of the user with respect to the content, and a calculator configured to calculate a recognition state of the user with respect to the content using the acquired gaze feature information and behavior feature information.

The behavior feature information acquirer may include a behavior pattern detector configured to detect the behavior pattern of a user who learns the content, and a behavior feature information extractor configured to extract the behavior feature information from the detected behavior pattern.

The behavior feature information may include at least one piece of information of a behavior trajectory, behavior speed, and behavior radius of each part of a human body.

The gaze feature information acquirer may include a gaze pattern detector configured to detect a gaze pattern of the user with respect to the content, and a gaze feature information extractor configured to extract the gaze feature information from the detected gaze pattern.

The gaze feature information comprises at least one piece of information of user pupil change, eye blinking, a gaze point, a path of a gaze point, time when a gaze falls on a specific area of learning content, and the number of times a gaze falls on the specific area.

The calculator may calculate a recognition state of a user with respect to the content via multiple information fusion analysis for analyzing a correlation between a predefined gaze pattern and behavior pattern with respect to content and the extracted gaze feature information and behavior feature information.

According to another aspect of the present invention, a user recognition enhancing method of a user recognition enhancing apparatus includes displaying pre-stored content, acquiring gaze feature information of a user with respect to the content, acquiring behavior feature information of the user with respect to the content, and calculating a recognition state of the user with respect to the content using the acquired gaze feature information and behavior feature information.

The acquiring of the behavior feature information may include detecting the behavior pattern of the user with respect to the content, and extracting the behavior feature information from the detected behavior pattern.

The behavior feature information may include at least one piece of information of a behavior trajectory, behavior speed, and behavior radius of each part of a human body.

The acquiring of the gaze feature information may include detecting a gaze pattern of the user with respect to the content, and extracting the gaze feature information from the detected gaze pattern.

The calculating may include calculating a recognition state of a user with respect to the content via multiple information fusion analysis for analyzing a correlation between a predefined gaze pattern and behavior pattern with respect to content and the extracted gaze feature information and behavior feature information.

According to another aspect of the present invention, a user recognition enhancing apparatus includes an inputter configured to receive an image displayed to a user, an area of interest (AOI) detector configured to detect a scan-path of a user with respect to the image and to detect an AOI of the user with respect to the image using the detected scan-path, an object recognizer configured to recognize a plurality of objects on the received image, a recognition determiner configured to compare the detected AOI and the plural detected objects to determine whether the user recognizes the plural objects, and an outputter configured to display information about an object that is not recognized by the user according to a determination result.

The AOI detector may detect gaze feature information from the detected scan-path and detect the AOI of the user using the extracted gaze feature information.

The gaze feature information may include at least one piece of information of user pupil change, eye blinking, a gaze point, a path of a gaze point, time when a gaze falls on the same area, and the number of times a gaze falls on the same area.

The AOI detector may detect the AOI of the user based on time when a gaze falls on the same area and the number of times a gaze falls on the same area.

The object recognizer may include an image information extractor configured to extract at least one piece of image information of luminance, edge, symmetry, and complementary color of the received image, a center-surround difference (CSD) processor configured to perform center-surround difference (CSD) and normalization processes on the extracted image information to output at least one of a luminance feature map, a direction feature map, a symmetry feature map, and a color feature map, an independent component analysis (ICA) processor configured to perform independent component analysis (ICA) on the output feature map to generate a salient map (SM), and an extractor configured to recognize a salient area on the salient map (SM) as an object.

The object recognizer may detect a plurality of objects in the received image using incremental hierarchical MAX (IHMAX).

The object recognizer may recognize a plurality of objects on the received image in real time, and the recognition determiner may determine a newly detected object or an object with variation among the plural recognized objects, and determines the newly detected object or the object with variation, which is not contained in the detected AOI, as a non-mapped object.

According to another aspect of the present invention, a user recognition enhancing method of a user recognition enhancing apparatus includes receiving an image displayed to a user, detecting a scan-path of a user with respect to the image, detecting an area of interest (AOI) of the user with respect to the image using the detected scan-path, recognizing a plurality of objects on the received image, comparing the detected AOI and the plural detected objects to determine whether the user recognizes the plural objects, and displaying information about an object that is not recognized by the user according to a determination result.

The detecting of the AOI may include extracting gaze feature information from the detected scan-path and detecting the AOI of the user using the extracted gaze feature information.

The gaze feature information may include at least one piece of information of user pupil change, eye blinking, a gaze point, a path of a gaze point, time when a gaze falls on the same area, and the number of times a gaze falls on the same area.

The detecting of the AOI may include detecting the AOI of the user based on time when a gaze falls on the same area and the number of times a gaze falls on the same area.

The recognizing may include extracting at least one piece of image information of luminance, edge, symmetry, and complementary color of the received image performing center-surround difference (CSD) and normalization processes on the extracted image information to output at least one of a luminance feature map, a direction feature map, a symmetry feature map, and a color feature map, performing independent component analysis (ICA) on the output, feature map to generate a salient map (SM), and recognizing a salient area on the salient map (SM) as an object.

The recognizing may include detecting a plurality of objects in the received image using incremental hierarchical MAX (IHMAX).

The recognizing may include recognizing a plurality of objects on the received image in real time, and the determining may include determining a newly detected object or an object with variation among the plural recognized objects and determining the newly detected object or the object with variation, which is not contained in the detected AOI, as a non-mapped object.

Advantageous Effects

According to embodiments of the present invention, an apparatus and method for enhancing user recognition may recognize important changing information, which is thoughtlessly missed by users, and provide the information to the users by analyzing a user scan-path, thereby enhancing user recognition.

According to embodiments of the present invention, an apparatus and method for enhancing user recognition may analyze learning capability of a user and provide user-centric learning content according to an individual learning object, thereby maximizing a learning state.

The user recognition apparatus may be embodied as an apparatus attached/detached to/from any place, such as a tablet computer, a mobile phone, etc. and is not required to be attached to a user body. Thus, the recognition enhancing apparatus may analyze a recognition state (or learning concentrativeness) of a user who is not secured, thereby enhancing user recognition.

MODE FOR INVENTION

Certain exemplary embodiments of the present invention will now be described in greater detail with reference to the accompanying drawings.

According to embodiments of the present invention, a recognition enhancing apparatus may analyze a user recognition state to enhance user recognition and may be embodied as a learning monitoring apparatus, a recognition analyzing apparatus, or the like. Here, the user recognition state may be defined as including user concentrativeness, interest, learning state, etc. with respect to content.

Figure 1:
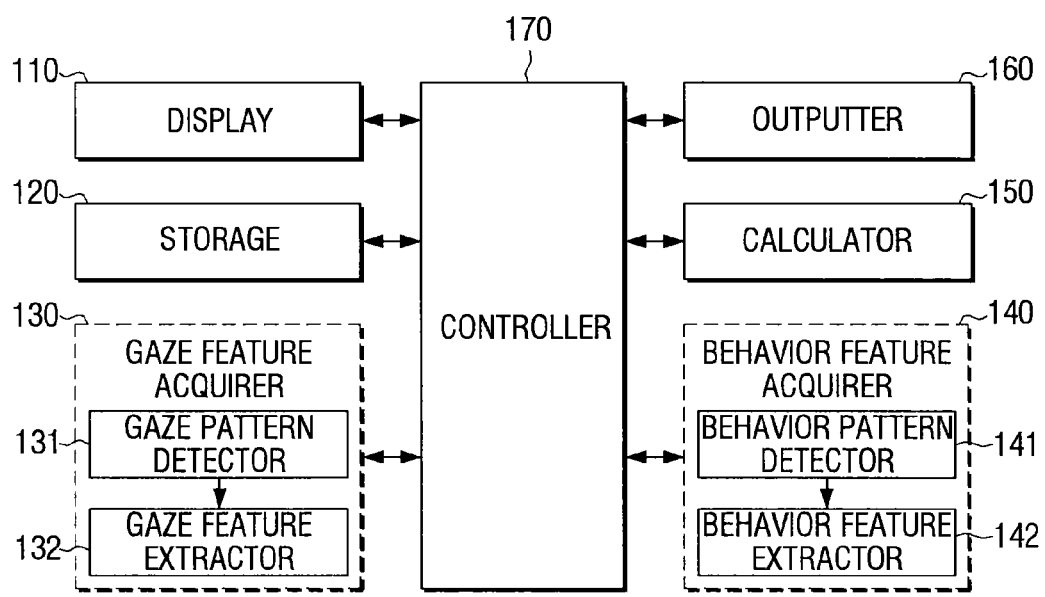
FIG. 1 is a block diagram illustrating a structure of a user recognition enhancing apparatus according to an embodiment of the present invention.

FIG. 1 is a block diagram illustrating a structure of a user recognition enhancing apparatus 100 according to an embodiment of the present invention. In detail, FIG. 1 illustrates the user recognition enhancing apparatus 100 according to first and second embodiments of the present invention and the user recognition enhancing apparatus 100 may perform a function of a learning monitoring apparatus.

Referring to FIG. 1, the user recognition enhancing apparatus 100 according to an embodiment of the present invention includes a display 110, a storage 120, a gaze feature acquirer 130, a behavior feature acquirer 140, a calculator 150, an outputter 160, and a controller 170.

The display 110 may display various pieces of information provided by the user recognition enhancing apparatus 100. In detail, the display 110 may display content stored in the storage 120 to a user. The display 110 may be embodied as a display such as a cathode ray tube (CRT), a liquid crystal display (LCD), etc. According to the present embodiment, the user recognition enhancing apparatus 100 directly displays content. However, alternatively, the content may be displayed by an external device. Here, the content may be learning content.

In addition, the display 110 may display additional learning content to the user based on a calculated recognition state, that is, a calculated learning state. For example, when the calculated learning state is weak, previous learning content may be re-displayed. In addition, when the calculated learning state corresponds to lack of word understanding, additional learning content such as a vocabulary list associated with the learning content to the user.

The storage 120 stores a plurality of contents. Here, content may be learning content associated with a language such as English, Korean, Chinese, Japanese, etc. In detail, the content may be image content, sound source content, or video content formed by combining an image and a sound source. The storage 120 may store information about a user gaze pattern and behavior pattern detected from a gaze pattern detector 131 and a behavior pattern detector 141 that will be described below or store gaze feature information and behavior feature information extracted from a gaze feature extractor 132 and a behavior feature extractor 142 that will be described below.

The storage 120 may store a predefined gaze pattern and behavior pattern used to analyze multiple information fusion by the calculator 150.

In addition, the storage 120 may be a memory installed in the user recognition enhancing apparatus 100, for example, a read only memory (ROM), a flash memory, or a hard disk drive (HDD). Alternatively, the storage 120 may be an external HDD or memory card connected to the user recognition enhancing apparatus 100, for example, a flash memory (M/S, xD, SD, etc.) or a universal serial bus (USB) memory, etc.

The gaze feature acquirer 130 acquires user gaze feature information about content. The gaze feature acquirer 130 may include the gaze pattern detector 131 and the gaze feature extractor 132.

The gaze pattern detector 131 detects a user gaze pattern with respect to content. In detail, the gaze pattern detector 131 may photograph a user eye using an imaging apparatus (or a photographing apparatus), detect a user pupil from a captured image, detect a user gaze based on a location of the detected user pupil, and sequentially perform these gaze detection processes to detect a user gaze pattern (or gaze movement, eyeball movement, or a scan-path). The detected user gaze pattern may be stored in the storage 120. The detected user gaze pattern includes information about change in user pupil, eye blinking, and an eye gaze point. According to the present embodiment, the display 110 and the gaze pattern detector 131 are separate components. However, in an actual case, the display 110 and the gaze pattern detector 131 may be embodied as one component using an eye tracking apparatus.

The gaze feature extractor 132 may extract gaze feature information from the detected user gaze pattern. In detail, the gaze feature extractor 132 may extract gaze feature information such as 'time to first fixation', 'fixation length', 'fixation count', 'observation length', 'observation count', 'fixation before', 'participant %', 'pupil size', and 'pupil gradient' from the user gaze pattern detected by the gaze pattern detector 131.

Here, the 'time to first fixation' refers to time until fixation of a user gaze after stimulation (a visual image) is provided, that is, time until first fixation of a user gaze, the 'fixation length' refers to time when a user gaze falls on an area of interest (AOI) of learning content, the 'fixation count' refers to the number of times a user gaze falls on an area of interest (AOI) of learning content, the 'observation length' refers to total time when a user gaze falls on an area of interest (AOI), the 'observation count' refers to the number of times a user gaze re-falls on an area of interest (AOI), the 'fixation before' refers to the number of times a user gaze is stopped before a user gaze first falls on an area of interest (AOI), and the 'participant %' refers to a percentage of users whose gazes fall on an area of interest (AOI) at least one time, that is, frequency of fixation of user gazes on an area of interest (AOI). The 'pupil size' refers to the size of a pupil, measured per unit time, and the 'pupil gradient' refers to variation in inclination of a pupil, measured per unit time. A method of extracting these pieces of the gaze feature information from a user gaze pattern is well known, and thus, a detailed description thereof will be omitted herein.

The behavior feature acquirer 140 acquires behavior feature information of a learning user. The behavior feature acquirer 140 may include the behavior pattern detector 141 and the behavior feature extractor 142.

The behavior pattern detector 141 detects a user behavior patter of content. In detail, the behavior pattern detector 141 may detect user skeleton information (coordinate of each joint) using a Kinect device and may continuously perform an operation for detection of the skeleton information to detect a behavior pattern (a movement trajectory of each joint and a movement speed of each joint). The detected behavior pattern may be stored in the storage 120.

Here, the Kinect device may include a depth camera and an RGB camera. The depth camera may include an infrared-ray (IR) projector and an IR CMOS camera. The IR projector of the depth camera may emit infrared light, and the emitted infrared light may be reflected by an object and detected by the IR CMOS camera. Thus, the Kinect device may calculate depth information of a target object. The RGB camera may capture a two-dimensional (2D) object image and may also recognize each joint of the human body. The Kinect device may detect three-dimensional (3D) information of an object based on depth information and 2D information of the object.

The behavior feature extractor 142 extracts behavior feature information from the detected user behavior pattern. In detail, the behavior feature extractor 142 may extract the behavior feature information such as a behavior trajectory, behavior speed, and behavior radius of each joint of the human body from the user behavior pattern detected by the behavior pattern detector 141. A method of extracting each piece of the behavior feature information from the user behavior pattern is well known, and thus, a detailed description thereof will be omitted herein.

The calculator 150 calculates a recognition state, that is, a learning state with respect to learning content using the extracted gaze feature information and behavior feature information. In detail, the learning state (or learning activity or learning concentrativeness) may be determined using the gaze feature information and behavior feature information extracted by the gaze feature acquirer 130 and the behavior feature acquirer 140.

For example, in the case of a learning concentrative state, a gaze moves in the same direction as a proceeding direction of learning content, and thus, time when a gaze falls on an area of interest (AOI) of learning content is long, the number of times a gaze falls on the same AOI is high, and the number of times of eye blinking is low, compared with a general state. In addition, the pupil size is increased compared with the general state. In addition, a behavior (or activity) radius of the head, hand, and foot of a user is not large and behavior speed is not high.

On the other hand, in the case of a learning non-concentrative state, a gaze moves irrespective of proceeding of learning content, and thus, time when a gaze falls on an area of interest (AOI) of learning content is short and the number of times a gaze falls on the same AOI is low, compared with a general state. In addition, the pupil size is reduced or is not changed compared with the general state. In addition, a behavior radius of the head, hand, and foot of a user is large and behavior speed is also high. When movement is not nearly detected, a current state may be determined as the learning non-concentrative state.

The calculator 150 may calculate a recognition state of content via multiple information fusion analysis for analyzing a correlation between a predefined gaze pattern and behavior pattern with respect to content and the extracted gaze feature information and behavior feature information.

Here, the predefined gaze pattern and behavior pattern reflect a feature index associated with academic achievement of a user based on psychological and physiological references and experimental data.

In detail, the calculator 150 may match the predefined gaze pattern and behavior pattern and the detected gaze feature information and behavior feature information to determine a recognition state, that is, a learning state of the user.

Here, the predefined gaze pattern is a defined pattern associated with reading capability. For example, when a person reads a sentence, he or she reads by punctuating in units of words or several words (chunk). Thus, the calculator 150 may compare and determine whether a currently detected user gaze pattern is similar to a reading gaze pattern of a competent user, whether the currently detected user gaze pattern is similar to a reading gaze pattern of a general user, and whether the currently detected user gaze pattern is similar to a reading gaze pattern of an incompetent user. In this case, the reading gaze pattern of the competent user, the reading gaze pattern of the general user, and the reading gaze pattern of the incompetent user may be stored as predefined gaze patterns in the storage 120.

In addition, the predefined behavior pattern is a defined pattern associated with a learning state. For example, the behavior pattern such as a handwriting behavior pattern, a listening behavior pattern, a sleeping behavior pattern, etc. may be defined by combining head movement and arm movement. Patterns associated with the learning state may be stored in the storage 120.

According to the present embodiment, only a learning attitude and learning capability are calculated as a learning state. However, in an actual case, embodiments of the present invention may also be applied to the case in which gaze feature information and behavior feature information as well as the learning attitude and the learning capability are known. For example, the embodiments of the present invention may be applied to calculate a work attitude, work capability, work concentrativeness, etc.

The outputter 160 may display the calculated recognition state. In detail, the outputter 160 may display the recognition state, that is, the learning state calculated by the calculator 150 in the form illustrated in FIG. 7.

The controller 170 controls each component of the user recognition enhancing apparatus 100. In detail, in response to a learning content start command being input, the controller 170 may control the display 110 to display learning content that is pre-stored in the storage 120. In addition, the controller 170 may control the gaze pattern detector 131 to detect a user gaze pattern on the displayed learning content and control the gaze feature extractor 132 to extract gaze feature information from the detected gaze pattern. The controller 170 may perform control to perform all processes of extracting the behavior feature information using the same method as a method of extracting the gaze feature information.

The controller 170 may control the calculator 150 to calculate a leaning state of learning content from the extracted gaze feature information and behavior feature information. In addition, the controller 170 may control the outputter 160 to display the calculated learning state.

According to the present embodiment, the determination result is displayed via the outputter 160. However, in an actual case, the determination result may be stored in the storage 120, printed via a printing apparatus, or transmitted to a specific apparatus.

Thus, the user recognition enhancing apparatus 100 according to the present embodiment may analyze a user gaze pattern to analyze a user recognition state. Thus, learning and work achievement may be analyzed based on the analyzed recognition state to provide user-centric learning content, thereby enhancing user recognition.

Thus far, the user recognition enhancing apparatus 100 according to the first and second embodiments of the present invention has been described. The user recognition enhancing apparatus 100 according to the first embodiment of the present invention may be obtained by omitting the behavior feature acquirer 140 from the structure described with reference to FIG. 1 and the calculator 150 according to the first embodiment of the present invention may analyze a user recognition state, that is, a learning state of a user with respect to content using only user gaze feature information.

The user recognition enhancing apparatus 100 according to the second embodiment of the present invention may include all components described with reference to FIG. 1 and analyze a user recognition state, that is, a learning state with respect to content using the gaze feature information and behavior feature information.

Hereinafter, the user recognition enhancing apparatus 100 according to the first embodiment of the present invention will be described with reference to FIGS. 2 and 3.

Figure 2:
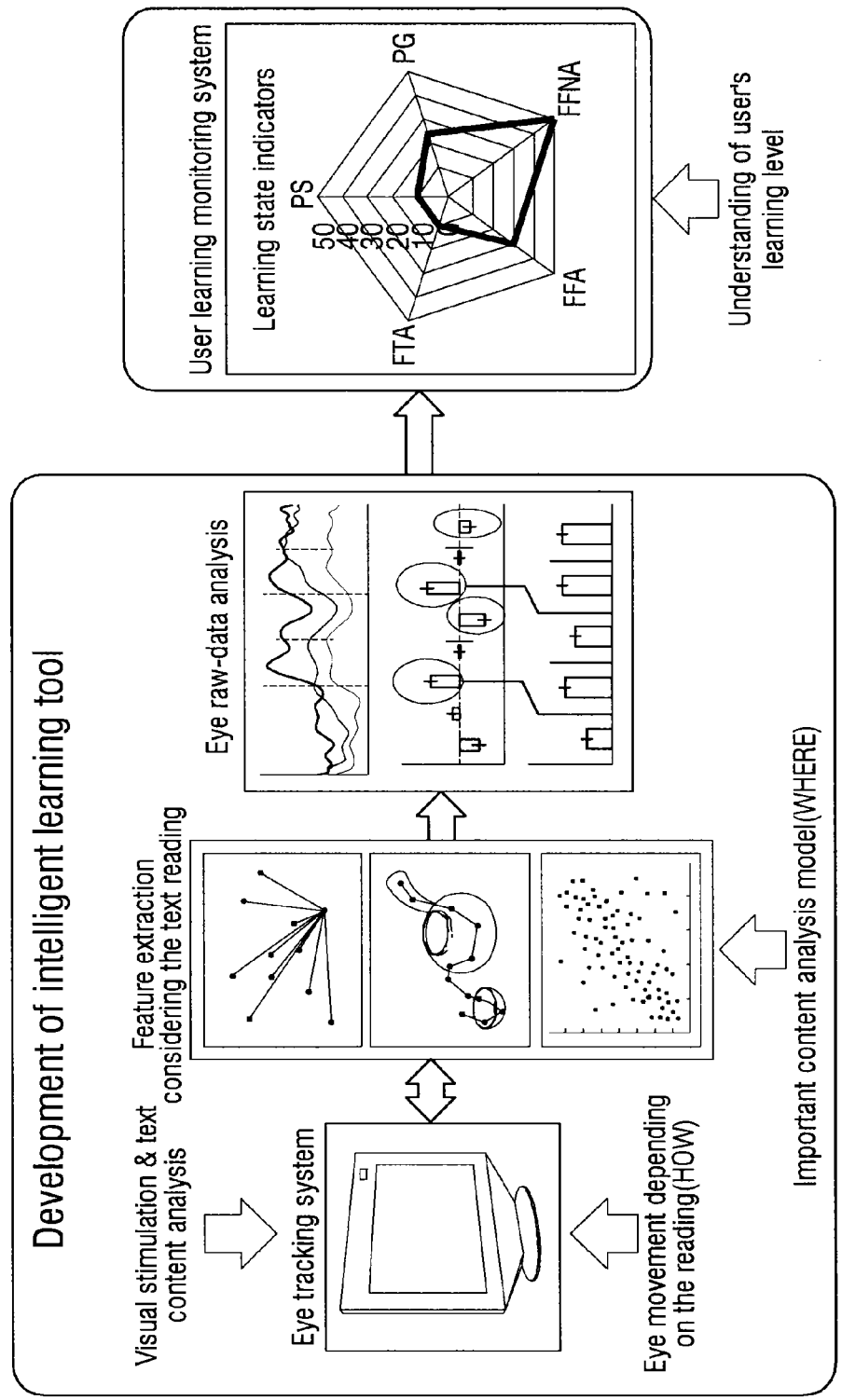
FIG. 2 is a diagram for explanation of an operation of a user recognition enhancing apparatus according to a first embodiment of the present invention.

FIG. 2 is a diagram for explanation of an operation of the user recognition enhancing apparatus 100 according to the first embodiment of the present invention.

Referring to FIG. 2, first, the display 110 displays learning content to a user. In response to the learning content being displayed, the gaze pattern detector 131 detects a scan-path of the user with respect to learning content.

In response to the scan-path being detected, the gaze feature extractor 132 may extract gaze feature information such as pupil change, eye blinking, a gaze point, 'time to first fixation', 'fixation length', 'fixation count', 'observation length', 'observation count', 'fixation before', and 'participant %' from the detected scan-path.

In response to the gaze feature information being extracted, the calculator 150 may calculate a user recognition state, that is, a learning state using a nearest neighbors (NN) learning machine and analyze a correlation between a predefined gaze pattern and the detected scan-path to calculate learning capability.

Figure 3:
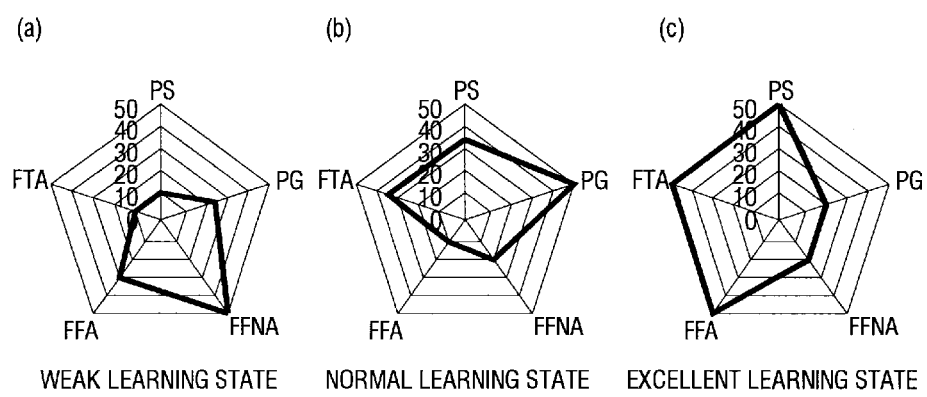
FIG. 3 is a diagram illustrating an example of output of an outputter according to the first embodiment of the present invention.

FIG. 3 is a diagram illustrating an example of output of the outputter 160 according to the first embodiment of the present invention.

As seen from FIG. 3, various recognition states, that is, learning states may be displayed via a diagram.

Here, a pupil size (PS) refers to the size of a pupil, measured per unit time.

Pupil gradient (PG) refers to variation in inclination of a pupil, measured per unit time.

Fixation time in AOI area (FTA) refers to integrated time in an AOI area measured per unit time and is a value corresponding to the aforementioned fixation length. Here, the AOI area is a region for displaying content.

Fixation frequency in AOI area (FFA) refers to integrated number of times in an AOI area measured per unit time, that is, the number of times gaze enters the AOI area and is a value corresponding to the aforementioned fixation count.

Fixation frequency in non AOI area (FFNA) refers to an integrated number of times in an area excerpt for the AOI area measured per unit time.

Hereinafter, the user recognition enhancing apparatus 100 according to the second embodiment of the present invention will be described with reference to FIGS. 4 to 7.

Figure 4:
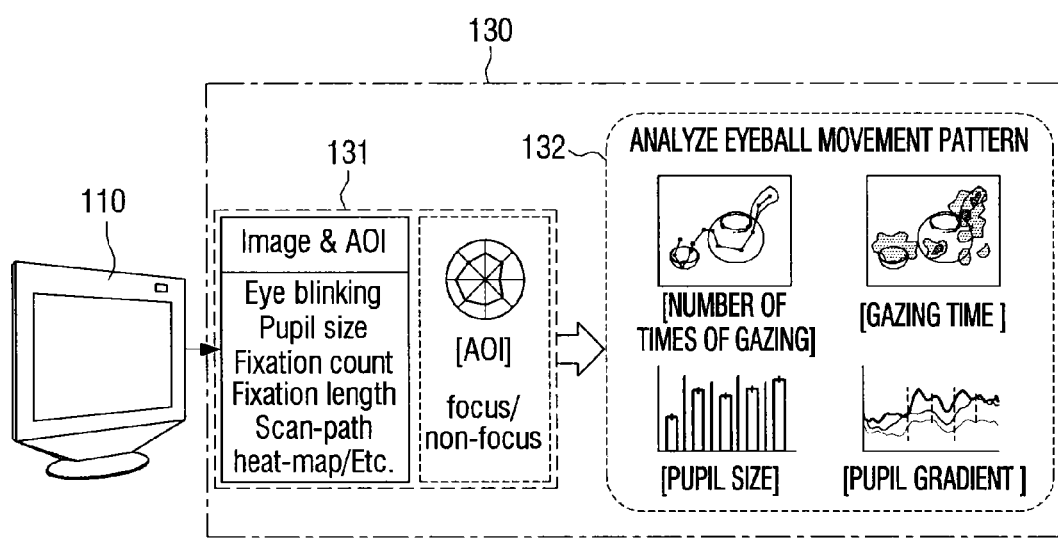
FIG. 4 is a diagram for explanation of an operation of a gaze feature acquirer according to a second embodiment of the present invention.

FIG. 4 is a diagram for explanation of an operation of the gaze feature acquirer 130 according to the second embodiment of the present invention.

Referring to FIG. 4, first, the display 110 displays learning content to a user. In response to the learning content being displayed, the gaze pattern detector 131 detects a user gaze pattern with respect to learning content.

In response to the gaze pattern being detected, the gaze feature extractor 132 may extract gaze feature information such as 'time to first fixation', 'fixation length', 'fixation count', 'observation length', 'observation count', 'fixation before', 'participant %', 'pupil size', and 'pupil gradient' from the detected gaze pattern.

Figure 5:
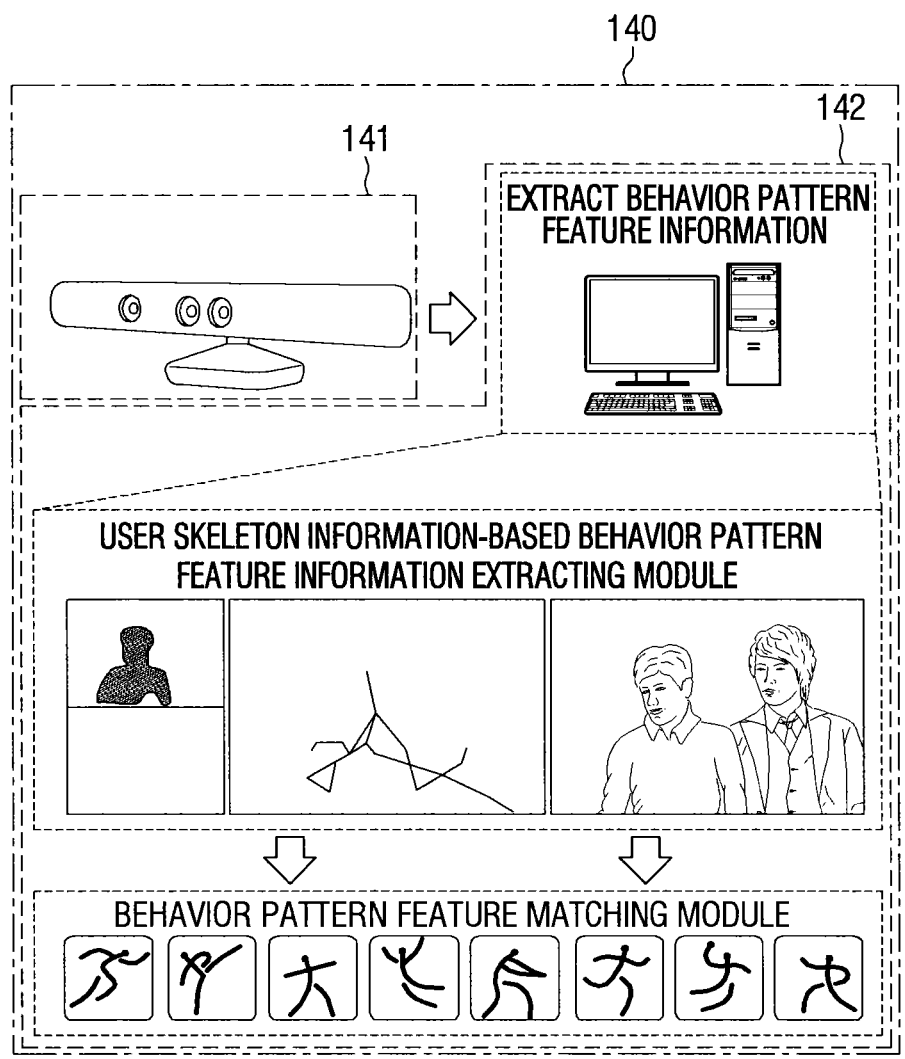
FIG. 5 is a diagram for explanation of an operation of a behavior feature acquirer according to the second embodiment of the present invention.

FIG. 5 is a diagram for explanation of an operation of the behavior feature acquirer 140 according to the second embodiment of the present invention.

Referring to FIG. 5, the behavior pattern detector 141 detects a user behavior pattern with respect to learning content. Here, the behavior pattern detector 141 may be a Kinect device. The Kinect device has been described in detail with reference to FIG. 1, and thus, a detailed description thereof will not be repeated herein.

In response to the behavior pattern being detected, the behavior feature extractor 142 may extract behavior feature information such as a behavior (movement), behavior speed, and behavior radius of each joint of the human body from the detected behavior pattern.

Figure 6:
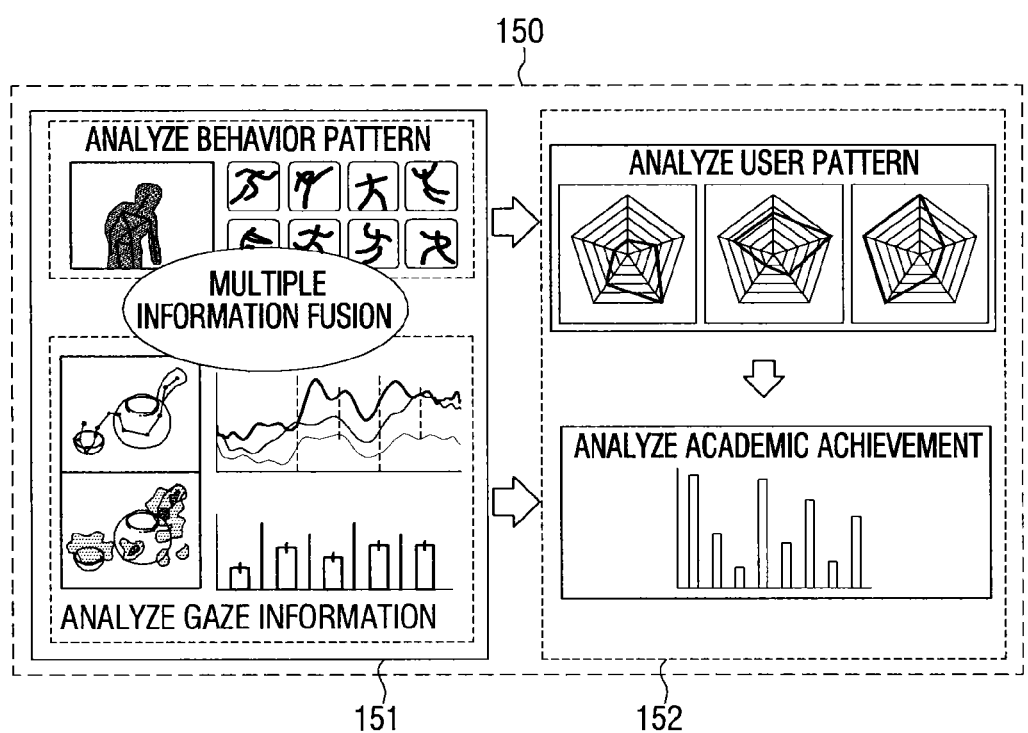
FIG. 6 is a diagram for explanation of an operation of a calculator according to the second embodiment of the present invention.

FIG. 6 is a diagram for explanation of an operation of the calculator 150 according to the second embodiment of the present invention.

The calculator 150 according to the second embodiment of the present invention may calculate a learning state with respect to learning content using the extracted gaze feature information and behavior feature information.

The calculator 150 may calculate a learning state 152 with respect to the leaning content via multiple information fusion analysis 151 of analyzing a correlation between the predefined gaze pattern and behavior pattern of the learning content and the extracted gaze feature information and behavior feature information.

Here, the predefined gaze pattern and behavior pattern reflect a feature index associated with academic achievement of a user based on psychological and physiological references and experimental data.

In detail, the calculator 150 may match the predefined gaze pattern and behavior pattern and the detected gaze feature information and behavior feature information to determine a learning state of the user.

Figure 7:
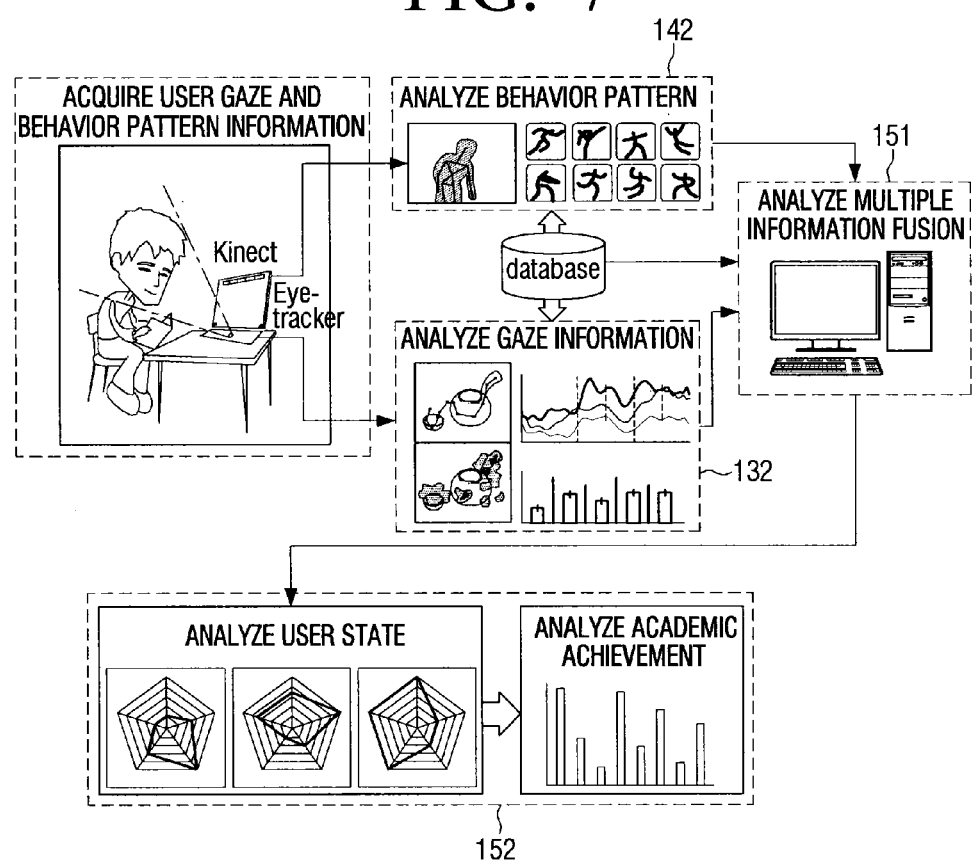
FIG. 7 is a diagram for explanation of an operation of a user recognition enhancing apparatus according to the second embodiment of the present invention.

FIG. 7 is a diagram for explanation of an operation of the user recognition enhancing apparatus 100 according to the second embodiment of the present invention.

Referring to FIG. 7, the display 110 may display learning content to a user, and the gaze pattern detector 131 and the behavior pattern detector 141 may detect a gaze pattern and a behavior pattern of a user, respectively. The gaze feature extractor 132 may extract gaze feature information from the detected gaze pattern and the behavior feature extractor 142 may extract behavior feature information from the detected behavior pattern.

In addition, the calculator 150 may calculate a learning state 152 with respect to the leaning content via the multiple information fusion analysis 151 of analyzing a correlation between the predefined gaze pattern and behavior pattern of the learning content and the extracted gaze feature information and behavior feature information.

Then, the calculated learning state may be displayed.

As illustrated in FIG. 7, a user recognition apparatus, that is, a learning monitoring apparatus may be fixed and installed on a user desk. In addition, the user recognition apparatus may be embodied as an apparatus attached/detached to/from any place, such as a tablet computer, a mobile phone, etc., and thus, may be installed irrespective of place.

In addition, a conventional apparatus for monitoring a learning state or learning concentrativeness is configured in such as way that a separate component (e.g., a brain wave monitor) is attached to a user body to monitor the user who is secured. On the other hand, the recognition enhancing apparatus illustrated in FIG. 7, that is, a learning monitoring apparatus is not required to be attached to the user body. Thus, the recognition enhancing apparatus may monitor a learning state (or learning concentrativeness) while the user is not secured.

Figure 8:
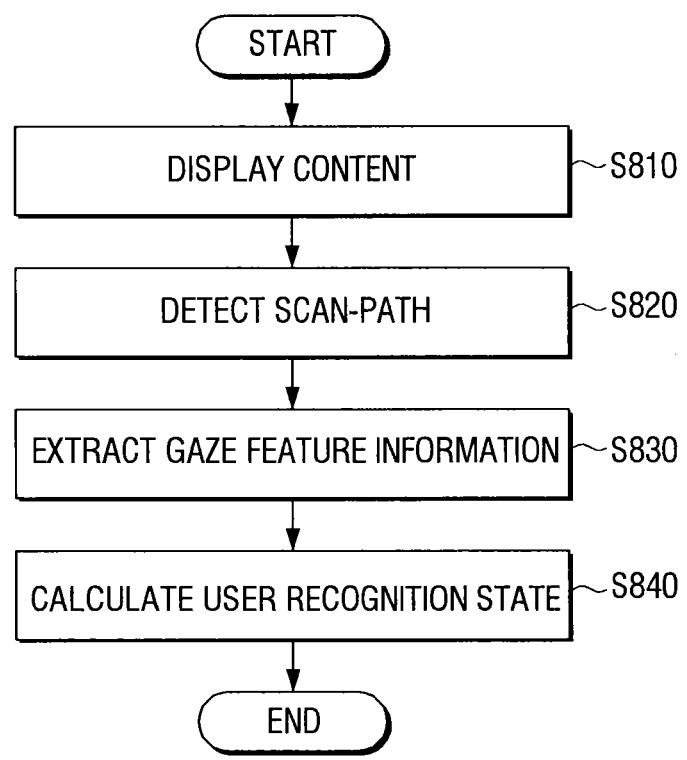
FIG. 8 is a flowchart for explanation of operations of a method of enhancing user recognition according to the first embodiment of the present invention.

FIG. 8 is a flowchart for explanation of operations of a method of enhancing user recognition according to the first embodiment of the present invention.

First, the user recognition enhancing apparatus 100 displays pre-stored content (S810). Here, the pre-stored content may be image content, sound source content, or video content associated with learning.

A user scan-path with respect to content is detected (S820). In detail, a user eye may be photographed using an imaging apparatus (or a photographing apparatus), a user pupil is detected from the captured image, a user gaze is detected based on a location of the detected user pupil, and an operation for detecting the gaze is continuously performed to detect a user scan-path (or gaze movement or eyeball movement).

Gaze feature information is extracted from the detected scan-path (S830). In detail, gaze feature information such as pupil change, eye blinking, a gaze point, 'time to first fixation', 'fixation length', 'fixation count', 'observation length', 'observation count', 'fixation before', and 'participant %' may be extracted from the detected user scan-path.

A recognition state, that is, a learning state with respect to content is calculated using the extracted gaze feature information (S840). In detail, the recognition state, that is, the learning state (or learning concentrativeness) may be determined using the extracted gaze information. In addition, a relation between the predefined gaze pattern and the detected scan-path may be analyzed to calculate learning capability.

Then, the calculated recognition state, that is, the learning state may be displayed and other learning content corresponding to the calculated learning state may be displayed.

Accordingly, the method of enhancing user recognition according to the present embodiment may analyze a user scan-path to analyze a user recognition state. Thus, user-centric learning content may be provided based on the analyzed recognition state, thereby enhancing user recognition with respect to learning content.

The recognition enhancing method illustrated in FIG. 8 may be executed on a user recognition enhancing apparatus including the components of FIG. 1 and may also be executed on a user recognition enhancing apparatus including other different components.

Figure 9:
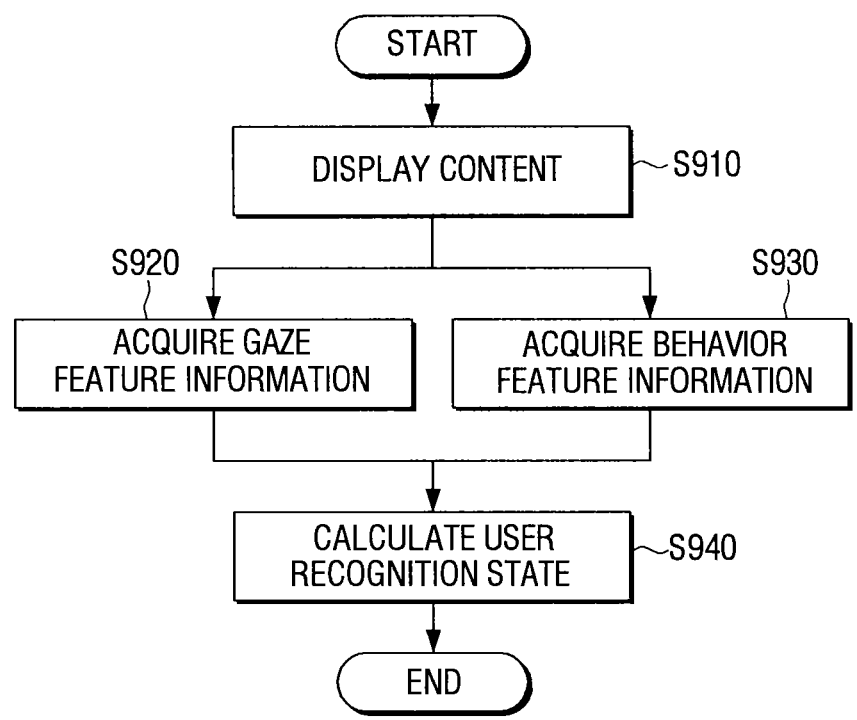
FIG. 9 is a flowchart for explanation of operations of a method of enhancing user recognition according to the second embodiment of the present invention.

FIG. 9 is a flowchart for explanation of operations of a method of enhancing user recognition according to the second embodiment of the present invention.

First, the user recognition enhancing apparatus 100 displays pre-stored content (S910). Here, the pre-stored content may be image content, sound source content, or video content associated with learning.

User gaze feature information about content is acquired (S620). Behavior feature information is acquired simultaneously with the acquisition of the gaze feature information (S630). The extraction of the gaze feature information and the behavior feature information has been described in detail with respect to FIG. 1, and thus, a detailed description thereof will not be repeated herein.

Here, the gaze feature information may be at least one of user pupil change, eye blinking, a gaze point, a path of a gaze point, time when a gaze falls on a specific area of learning content, and the number of times a gaze falls on a specific area. In addition, the behavior feature information may be at least one of a behavior trajectory, behavior speed, and behavior radius of each part of the human body.

A user recognition state, that is, a learning state with respect to content is calculated using the acquired gaze feature information and behavior feature information (S640).

Then, the calculated recognition state, that is, the learning state may be displayed, and other learning content corresponding to the calculated recognition state may be displayed.

Accordingly, the method of enhancing user recognition according to the present embodiment may analyze user gaze feature information and behavior feature information to analyze a user learning state. Thus, user-centric learning content may be provided based on the analyzed learning state, thereby enhancing user recognition with respect to learning content.

The recognition enhancing method illustrated in FIG. 9 may be executed on a user recognition enhancing apparatus including the components of FIG. 1 and may also be executed on a user recognition enhancing apparatus including other different components.

The apparatus and method for enhancing user recognition according to the first and second embodiments of the present invention may analyze a user recognition state, that is, a learning state with respect to learning content to provide user-centric learning content, thereby enhancing user recognition.

The user recognition enhancing apparatus 100 according to a third embodiment of the present invention, for recognizing important changing information, which is thoughtlessly missed by users, and providing the information to the users, may perform a function of a user recognition analyzing apparatus, which will be described below.

Figure 10:
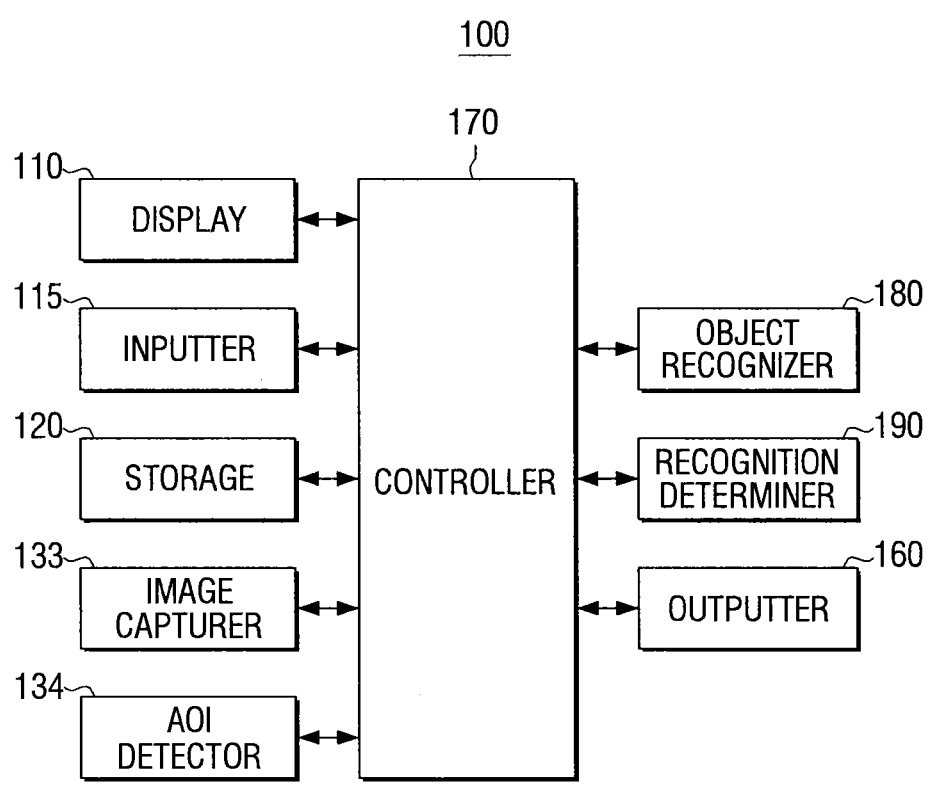
FIG. 10 is a block diagram illustrating a structure of a user recognition enhancing apparatus according to a third embodiment of the present invention.

FIG. 10 is a block diagram illustrating a structure of the user recognition enhancing apparatus 100 according to the third embodiment of the present invention.

Referring to FIG. 10, the user recognition enhancing apparatus 100 according to the present embodiment includes the display 110, an inputter 115, the storage 120, an image capturer 133, an AOI detector 134, the outputter 160, the controller 170, an object recognizer 180, and a recognition determiner 190.

The display 110 may display pre-stored content. The display 110 may perform the same function as the display of FIG. 1.

The inputter 115 receives an image displayed to a user. In detail, the inputter 115 may receive an image displayed on an external display apparatus or the display 110 or may directly capture an actual environment image that a user views using an imaging apparatus.

The storage 120 stores the received image. In detail, the storage 120 may store the image input via the inputter 115. In addition, the storage 120 stores the captured image. In detail, the storage 120 may store the image captured by the image capturer 133. In addition, the storage 120 may store extracted gaze feature information and detected AOI from the AOI detector 134 that will be described below, store information about an object recognized by the object recognizer 180 that will be described below, and temporarily store a determination result of the recognition determiner 190 that will be described below.

The storage 120 may store learning information about an NN learning (or NN model) machine. In addition, the storage 120 may be a memory installed in the user recognition enhancing apparatus 100, for example, a read only memory (ROM), a flash memory, or a hard disk drive (HDD). Alternatively, the storage 120 may be an external HDD or memory card connected to the user recognition enhancing apparatus 100, for example, a flash memory (M/S, xD, SD, etc.) or a universal serial bus (USB) memory, etc.

Here, the NN learning machine is a component for receiving a plurality of input items (e.g., 'fixation length' and 'fixation count') and detecting an AOI of a user using a neural network algorithm. According to the present embodiment, an AOI is detected using the NN learning machine. However, other learning machines may be used.

The image capturer 133 photographs a user pupil. In detail, the image capturer 133 photographs the user pupil (in detail, an eye area). According to the present embodiment, a user pupil is photographed using an image capturer of the user recognition enhancing apparatus 100. However, in an actual case, a captured pupil image may be received from an external eye tracker. According to the present embodiment, only a still image is used. However, alternatively, the image capturer 133 may photograph the user pupil in the form of a moving picture.

The image capturer 133 may perform the same function of an imaging device included in the gaze pattern detector 131 of FIG. 1.

The AOI detector 134 detects a user scan-path and detects an AOI of a user with respect to an image using the detected user scan-path. In detail, the AOI detector 134 may detect a user gaze based on a location of a user pupil photographed by the image capturer 133 and may continuously perform a gaze detection operation to detect a user gaze pattern (or gaze movement, eyeball movement, or scan-path).

According to the present embodiment, the image capturer 133 and the AOI detector 134 are separate components. However, in an actual case, the image capturer 133 and the AOI detector 134 may be embodied as one component using an eye tracking apparatus.

The AOI detector 134 may extract gaze feature information from the detected scan-path.

Here, the gaze feature information may be information such as pupil change, eye blinking, a gaze point, 'time to first fixation', 'fixation length', 'fixation count', 'observation length', 'observation count', 'fixation before', and 'participant %'.

Here, the 'time to first fixation' refers to time until fixation of a user gaze after stimulation (a visual image) is provided, that is, time until first fixation of a user gaze, the 'fixation length' refers to time when a user gaze falls on an area of interest (AOI) of the received image, the 'fixation count' refers to the number of times a user gaze falls on an area of interest (AOI) of the received image, the 'observation length' refers to total time when a user gaze falls on an area of interest (AOI), the 'observation count' refers to the number of times a user gaze re-falls on an area of interest (AOI), the 'fixation before' refers to the number of times a user gaze is stopped before a user gaze first falls on an area of interest (AOI), and the 'participant %' refers to a percentage of users whose gazes fall on an area of interest (AOI) at least one time, that is, frequency of fixation of user gazes on an area of interest (AOI). A method of extracting each piece of the gaze feature information from a user scan-path is well known, and thus, a detailed description thereof will be omitted herein.

In addition, the AOI detector 134 may detect an AOI of the user based on the time when a gaze falls and the number of times a gaze falls on the same area, from the extracted gaze feature information.

The AOI detector 134 may perform the same function as the gaze feature acquirer 130 of FIG. 1.

For example, with regard to the AOI of the user, time when a gaze falls on the AOI is long and the number of times a gaze falls on the same AOI is high. Thus, the AOI detector 134 may detect the AOI of the user using the 'fixation length' (that is, time when a gaze falls on the same area) and the 'fixation count' (that is, the number of times a gaze falls on the same area) from the extracted gaze feature information, via an NN learning machine.

The outputter 160 displays information of an object that is not recognized by the user. In detail, the outputter 160 may display information (e.g., information about that an object that is not recognized by the user is present, information about a location of the corresponding object, etc.) of an object that is not determined to be mapped by the recognition determiner 190 that will be described below. In detail, the outputter 160 may be embodied as the display 110 such as a monitor and may display information about the object that is not recognized by the user together with the image input from the inputter 115.

The object recognizer 180 recognizes a plurality of objects on the received image. In detail, the object recognizer 180 may detect a plurality of objects from the image input through the inputter 115 using an incremental hierarchical MAX (IHMAX). A detailed configuration and operation of the object recognizer 180 will be described with reference to FIG. 14.

Here, the incremental hierarchical MAX (IHMAX) refers to an algorithm for extracting an object from an image, is an object model that copies a visual information processing mechanism of the human for gradually learning a large amount of object information from a complex real image, and may also recognize a non-learned object.

The recognition determiner 190 compares the detected AOI and the detected plural objects to determine an object that is not mapped to the detected AOI among the plural objects. In detail, the recognition determiner 190 may determine a newly detected object or an object with variation among the plural objects recognized by the object recognizer 180 and determine the newly detected object or the object with variation, which is not contained in the detected AOI, as a non-mapped object (i.e., an object that is not recognized by the user). The recognition determiner 190 may determine the object that is not recognized by the user using a semantic network correlation. The semantic network correlation will be described with reference to FIG. 15.

The controller 170 controls components of the user recognition enhancing apparatus 100. In detail, the controller 170 may control the image capturer 133 to photograph a user eyeball and control the AOI detector 134 to detect a user scan-path and AOI from the captured eyeball image in order to detect the AOI of the user. In addition, the controller 170 may control the object recognizer 180 to recognize an object of the received image and control the recognition determiner 190 to determine whether the user recognizes the recognized object.

In addition, the controller 170 may control the outputter 160 to provide information about an object that is not recognized by the user to the user.

Thus, a user recognition enhancing apparatus according to the present embodiment may recognize important changing information, which is thoughtlessly missed by users and provide the information to the users, thereby enhancing user recognition.

According to the present embodiment, only the case in which an object that is not recognized by the user is displayed through the outputter 160 has been described. However, an actual case, information about the object that is not recognized by the user may be stored in the storage 120, printed via a printing apparatus, output in the form of voice, or transmitted to a specific apparatus.

Figure 11:
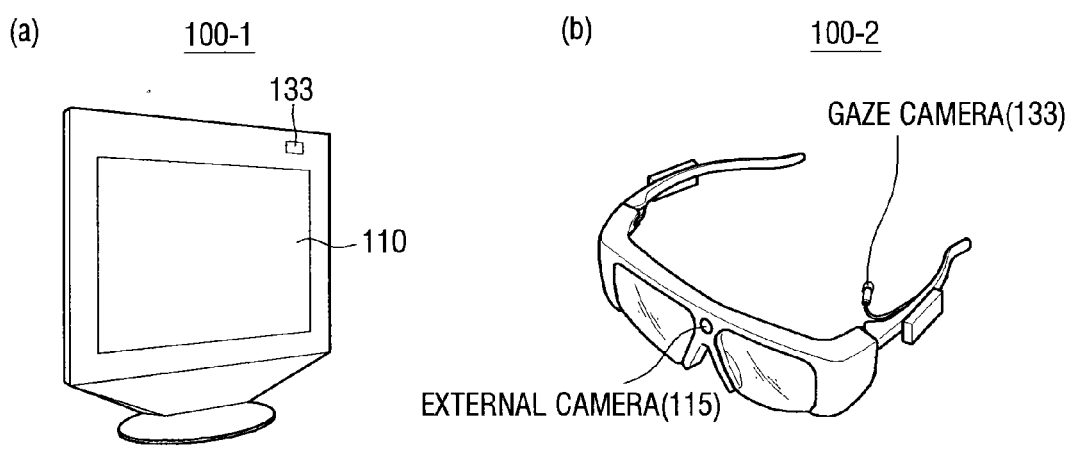
FIG. 11 is a diagram for explanation of detailed forms of an inputter and an image capturer according to the third embodiment of the present invention.

FIG. 11 is a diagram for explanation of detailed forms of the inputter 115 and the image capturer 133 according to the third embodiment of the present invention.

In detail, FIG. 11 illustrates an eye tracker 100-1. Referring to FIG. 11, when the eye tracker 100-1 is applied to the user recognition enhancing apparatus 100, the inputter 115 may receive an image displayed on the display 110 of the eye tracker 100-1. In addition, a camera for photographing a pupil of a user of the eye tracker 100-1 may be the image capturer 133.

FIG. 11 illustrates an interface apparatus 100-2 in the form of glasses. The glass type interface apparatus may recognize a plurality of objects in a received image through the recognition determiner 190, and the recognition determiner 190 may determine whether a user recognizes a plurality of objects recognized using a detected AOI.

Figure 12:
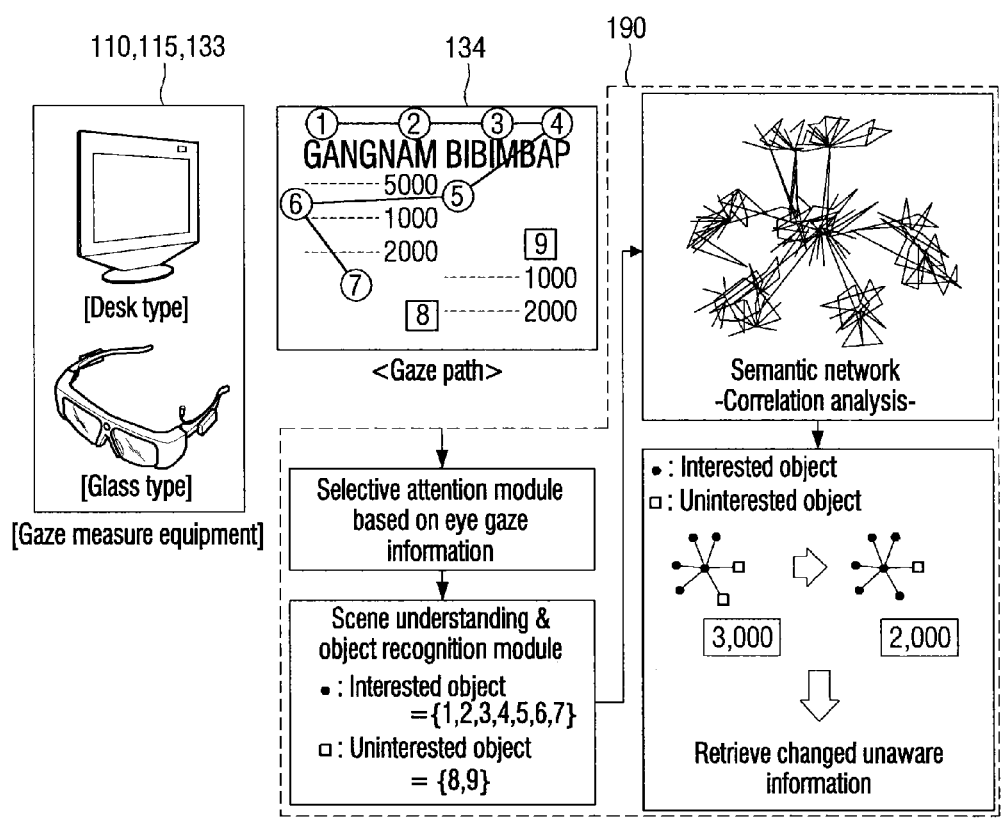
FIG. 12 is a diagram for explanation of an operation of a user recognition enhancing apparatus according to the third embodiment of the present invention.

FIG. 12 is a diagram for explanation of an operation of a user recognition enhancing apparatus according to the third embodiment of the present invention.

Referring to FIG. 12, first, the inputter 115 receives an image displayed to a user through the display 110 or a real-life image that a user gazes. In addition, the AOI detector 134 detects a user scan-path.

In response to the scan-path being detected, the AOI detector 134 may extract gaze feature information such as pupil change, eye blinking, an eye gaze point, 'time to first fixation', 'fixation length', 'fixation count', 'observation length', 'observation count', 'fixation before', and 'participant %' from the detected scan-path.

In response to the gaze feature information being extracted, the AOI detector 134 may detect a user AOI using a nearest neighbors (NN) learning machine.

In addition, the object recognizer 180 may recognize a plurality of objects in an image input through the inputter 115, and the recognition determiner 190 may determine whether a user recognizes a plurality of objects recognized using the detected AOI.

Figure 13:
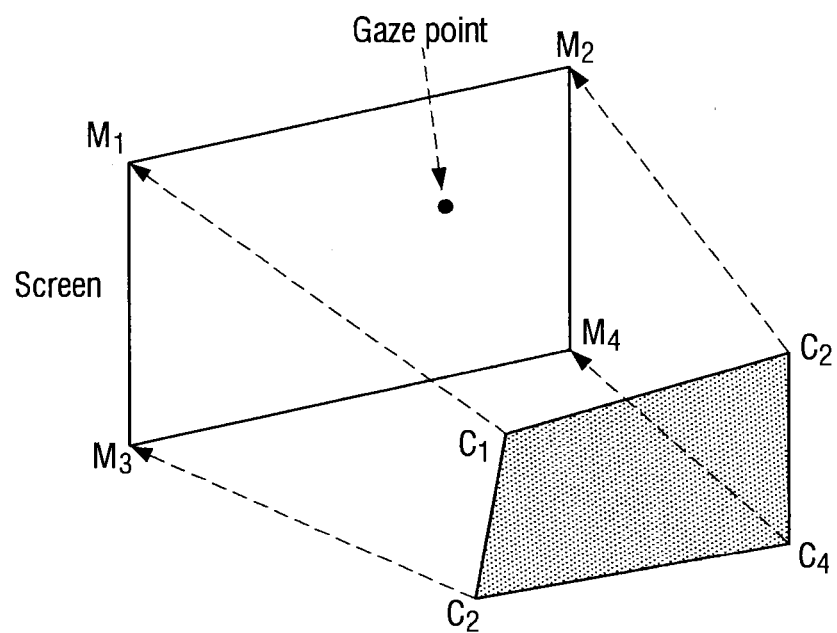
FIG. 13 is a diagram for explanation of an operation of an AOI detector according to the third embodiment of the present invention.

FIG. 13 is a diagram for explanation of an operation of the AOI detector 134 according to the third embodiment of the present invention.

In detail, the scan-path detected by the AOI detector 134 needs to be mapped (calibrated) according to the size of a monitor or the size of an external image. That is, in order to map a location of a user pupil and an area of an actual object, the mapping process illustrated in FIG. 13 may be performed to detect the AOI of the user.

Figure 14:
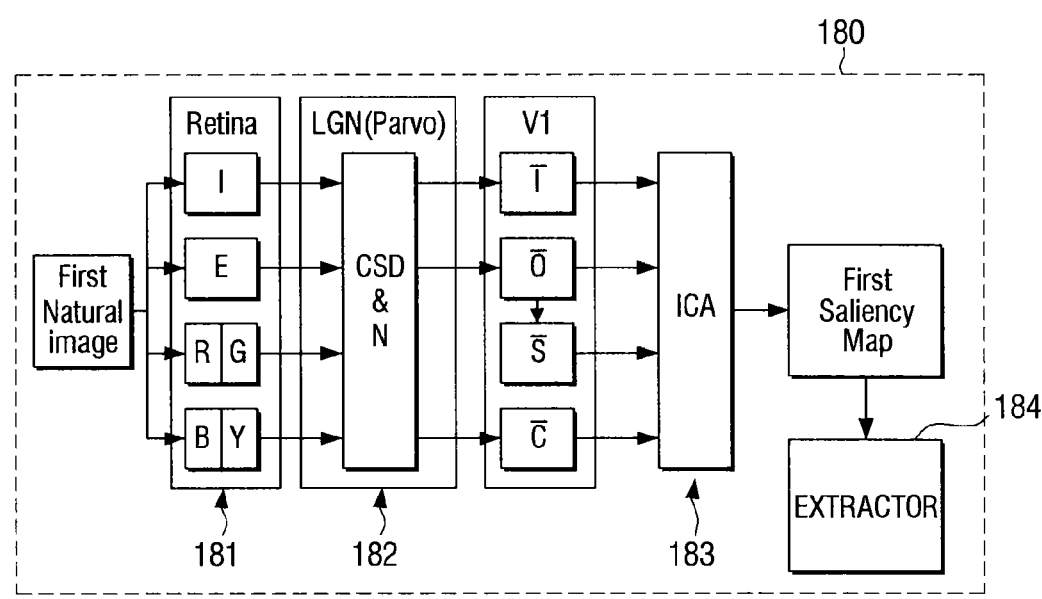
FIG. 14 is a diagram for explanation of a detailed operation of an object recognizer according to the third embodiment of the present invention.

FIG. 14 is a diagram for explanation of a detailed operation of the object recognizer 180 according to the third embodiment of the present invention.

Referring to FIG. 14, the object recognizer 180 includes an image information extractor 181, a center-surround difference (CSD) processor 182, an independent component analysis (ICA) processor 183, and an extractor 184.

The image information extractor 181 extracts image information of luminance (I), edge (E), and complementary color (RG, BY) of a received image. In detail, image information extractor 181 may extract at least one image information of luminance, edge, symmetry, and complementary color of the received image based on values of R (Red), G (Green), and B (Blue) of an image of the inputter 115.

The CSD processor 182 may perform center-surround difference (CSD) and normalization processes on the extracted image information to generate a luminance feature map, a direction feature map, a symmetry feature map, and a color feature map.

In addition, the ICA processor 183 may perform independent component analysis on the extracted feature map to generate a salient map (SM).

The extractor 184 recognizes a salient area on the salient map (SM) as an object. In detail, the extractor 184 may perform strengthening and suppressing on a plurality of salient points included in the salient map (SM) output from the ICA processor 183 using pre-learned information to apply an priorities to the plural salient points and to detect an area with predetermine priority.

Figure 15:
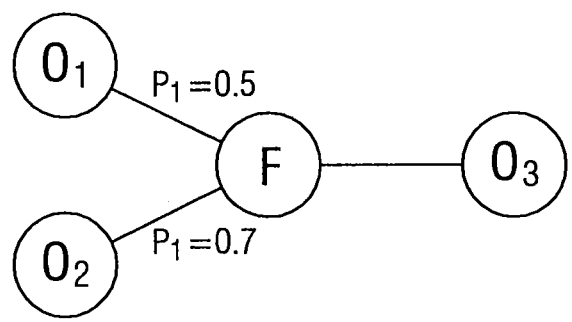
FIG. 15 is a diagram for explanation of an operation of a recognition determiner according to the third embodiment of the present invention.

FIG. 15 is a diagram for explanation of an operation of the recognition determiner 190 according to the third embodiment of the present invention.

According to the hypothesis "memory-retrieval explanation" of the cognitive psychology, in order to resolve a problem associated with a familiar situation, a person wants to recall a detailed example of a problem and to resolve the problem, which means that a person retrieves a significant amount of associated information for resolving the program from a memory.

Accordingly, a user recognition apparatus according to the present embodiment may propose a plurality of pieces of associated information using a probabilistic semantic network based on human's insufficient memory capacity and memory retrieving capacity, thereby enhancing user recognition.

In detail, objects selected according to user gaze information may have one or more semantic relatedness which may be obtained via measurement of semantic similarity between words. The semantic similarity between objects is illustrated in FIG. 15.

Referring to FIG. 15, a node includes an object node and a function/action node. The attributes of an edge connecting the two nodes may have a probability value indicating semantic similarity as well as time and space, and the probability value may be obtained via a latent semantic analysis (LSA) method.

A semantic network for enhancement of recognition is expressed in the form of a network indicating semantic similarity between the object node and function/action nodes. The function node needs to be selected as a node for retrieving a candidate object with a high correlation with recognized objects, and the function/action node is set as a node with a highest correlation between objects in order to reduce semantic ambiguity according to situation of objects.

Accordingly, according to the present embodiment, a semantic correlation between objects of a semantic network between objects selected via a gaze may be analyzed to determine a difference degree with information pre-recorded in a database.

In addition, information change may be recognized from existing information using an object recognition model and information of a semantic network based on important information at another place on which a gaze does not fall.

Figure 16:
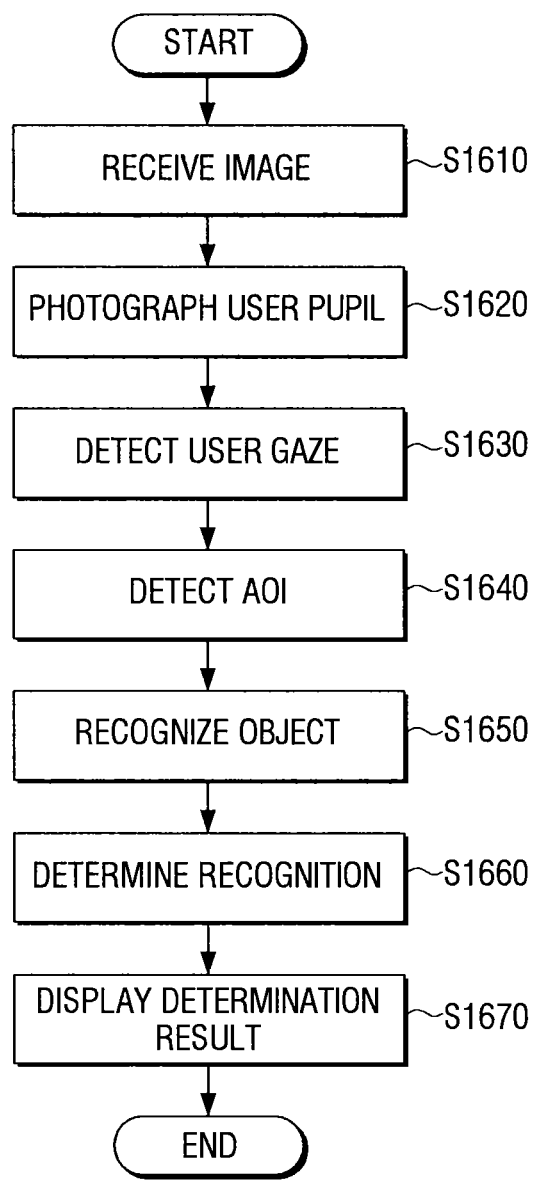
FIG. 16 is a flowchart for explanation of a method of enhancing user recognition according to the third embodiment of the present invention.

FIG. 16 is a flowchart for explanation of a method of enhancing user recognition according to the third embodiment of the present invention.

Referring to FIG. 16, first, an image displayed to a user is received (S1610). In detail, the image displayed on a display may be received or a captured image of an area that the user views may be received.

In addition, a user scan-path of the image is detected. In detail, a user pupil is photographed (S1620), a user scan-path is detected using the captured pupil image (S1630), and user feature information is extracted from the detected scan-path and a user AOI is detected using the extracted user feature information (S1640). Here, the gaze feature information may be pupil change, eye blinking, an eye gaze point, 'time to first fixation', 'fixation length', 'fixation count', 'observation length', 'observation count', 'fixation before', or 'participant %'.

A plurality of objects on the received image is recognized (S1650). In detail, the plural images on the received images may be detected using incremental hierarchical MAX (IH-MAX).

In addition, the detected AOI and the plural detected objects are compared to determine whether a user recognizes the plural objects (S1660). In detail, a newly detected object or an object with variation may be determined among the plural recognized objects and the newly detected object or the object with variation, which is not contained in the detected AOI, may be determined as a non-mapped object (i.e., an object that is not recognized by the user).

Information of the object that is not recognized by the user is displayed according to the determination result (S1670).

Thus, a user recognition method according to the present embodiment may recognize important changing information, which is thoughtlessly missed by users and provide the information to the users, thereby enhancing user recognition. The user recognition method illustrated in FIG. 16 may be executed on a user recognition enhancing apparatus including the components of FIG. 10 and may also be executed on a user recognition enhancing apparatus including other different components.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

The invention claimed is:

1. A user recognition enhancing apparatus comprising:
   a storage configured to store content;
   a display configured to display the stored content;
   a gaze pattern detector configured to detect a gaze pattern of a user with respect to the content;
   a gaze feature extractor configured to extract gaze feature information from the detected gaze pattern, the gaze feature information comprising information on a number of times a user gaze re-falls on a specific area of the content and information on a time duration that the user gaze falls on the specific area; and
   a calculator configured to calculate a learning capability of the user with respect to the content using the gaze pattern, and calculate a learning attitude of the user.

2. The user recognition enhancing apparatus as claimed in claim 1, wherein the gaze feature information further comprises at least one piece of information of user pupil change, eye blinking, a gaze point, and a path of a gaze point.

3. The user recognition enhancing apparatus as claimed in claim 1, wherein the calculator analyzes a correlation between a predefined gaze pattern about the content and the detected gaze pattern to calculate the learning capability of the user with respect to the content.

4. The user recognition enhancing apparatus as claimed in claim 3, wherein the predefined gaze pattern is a defined pattern associated with reading capability.

5. The user recognition enhancing apparatus as claimed in claim 1, wherein the content is learning content.

6. A user recognition enhancing method of a user recognition enhancing apparatus, comprising:
   displaying pre-stored content;
   detecting a gaze pattern of a user with respect to the content;
   extracting gaze feature information from the gaze pattern, the gaze feature information comprising information on a number of times a user gaze re-falls on a specific area of the content and information on a time duration that the user gaze falls on the specific area;

calculating a learning capability of the user with respect to the content using the gaze pattern; and calculating a learning attitude of the user with respect to the content using the extracted gaze feature information.

7. The user recognition enhancing method as claimed in claim 6, wherein the gaze feature information further comprises at least one piece of information of user pupil change, eye blinking, a gaze point, and a path of a gaze point.

8. The user recognition enhancing method as claimed in claim 6, wherein the calculating comprises analyzing a correlation between a predefined gaze pattern about the content and the detected gaze pattern to calculate the learning capability of the user with respect to the content.

9. The user recognition enhancing method as claimed in claim 8, wherein the predefined gaze pattern is a defined pattern associated with reading capability.

10. The user recognition enhancing method as claimed in claim 6, wherein the content is learning content.

11. A user recognition enhancing apparatus comprising:
a storage configured to store content;
a display configured to display the stored content;
a gaze feature information acquirer configured to acquire gaze feature information of a user with respect to the content;
a behavior feature information acquirer configured to acquire behavior feature information of the user with respect to the content; and
a calculator configured to calculate a recognition state of the user with respect to the content using the acquired gaze feature information and behavior feature information,
wherein the calculator calculates the recognition state by analyzing a correlation between the behavior feature information and a predetermined behavior pattern selected from the group consisting of a handwriting behavior pattern, a listening behavior pattern, and a sleeping behavior pattern.

12. The user recognition enhancing apparatus as claimed in claim 11, wherein the behavior feature information acquirer comprises:
a behavior pattern detector configured to detect the behavior pattern of a user who learns the content; and
a behavior feature information extractor configured to extract the behavior feature information from the detected behavior pattern.

13. The user recognition enhancing apparatus as claimed in claim 11, wherein the behavior feature information comprises at least one piece of information of a behavior trajectory, behavior speed, and behavior radius of each part of a human body.

14. The user recognition enhancing apparatus as claimed in claim 11, wherein the gaze feature information acquirer comprises:
a gaze pattern detector configured to detect a gaze pattern of the user with respect to the content; and
a gaze feature information extractor configured to extract the gaze feature information from the detected gaze pattern.

15. The user recognition enhancing apparatus as claimed in claim 11, wherein the gaze feature information comprises at least one piece of information of user pupil change, eye blinking, a gaze point, a path of a gaze point, time when a gaze falls on a specific area of learning content, and the number of times a gaze falls on the specific area.

16. The user recognition enhancing apparatus as claimed in claim 11, wherein the calculator calculates a recognition state of a user with respect to the content via multiple information fusion analysis for analyzing a correlation between a predefined gaze pattern and behavior pattern with respect to the content and the extracted gaze feature information and behavior feature information.

17. A user recognition enhancing method of a user recognition enhancing apparatus, comprising:
displaying pre-stored content;
acquiring gaze feature information of a user with respect to the content;
acquiring behavior feature information of the user with respect to the content; and
calculating a recognition state of the user with respect to the content using the acquired gaze feature information and behavior feature information,
wherein the calculating comprises analyzing a correlation between the behavior feature information and a predetermined behavior pattern selected from the group consisting of a handwriting behavior pattern, a listening behavior pattern, and a sleeping behavior pattern.

18. The user recognition enhancing method as claimed in claim 17, wherein the acquiring of the behavior feature information comprises:
detecting the behavior pattern of the user with respect to the content; and
extracting the behavior feature information from the detected behavior pattern.

19. The user recognition enhancing method as claimed in claim 17, wherein the behavior feature information comprises at least one piece of information of a behavior trajectory, behavior speed, and behavior radius of each part of a human body.

20. The user recognition enhancing method as claimed in claim 17, wherein the acquiring of the gaze feature information comprises:
detecting a gaze pattern of the user with respect to the content; and
extracting the gaze feature information from the detected gaze pattern.

21. The user recognition enhancing method as claimed in claim 17, wherein the calculating comprises calculating a recognition state of a user with respect to the content via multiple information fusion analysis for analyzing a correlation between a predefined gaze pattern and behavior pattern with respect to the content and the extracted gaze feature information and behavior feature information.

22. A user recognition enhancing apparatus comprising:
an inputter configured to receive an image displayed to a user;
an area of interest (AOI) detector configured to detect a scan-path of a user with respect to the image and to detect an AOI of the user with respect to the image using the detected scan-path;
an object recognizer configured to recognize a plurality of objects on the received image;
a recognition determiner configured to compare the detected AOI and the plural detected objects to determine whether the user recognizes the plural objects; and
an outputter configured to display information about an object that is not recognized by the user according to a determination result,
wherein, when a gaze re-falls on a specific area of the image for a predetermined time and the number of times a gaze falls on the specific area exceeds a predetermined number, the AOI detector detects the specific area as an AOI of the user with respect to the image.

23. The user recognition enhancing apparatus as claimed in claim 22, wherein the AOI detector detects gaze feature information from the detected scan-path and detects the AOI of the user using the extracted gaze feature information.

24. The user recognition enhancing apparatus as claimed in claim 23, wherein the gaze feature information comprises at least one piece of information of user pupil change, eye blinking, a gaze point, a path of a gaze point, time when a gaze falls on the same area, and the number of times a gaze falls on the same area.

25. A user recognition enhancing apparatus comprising:
an inputter configured to receive an image displayed to a user;
an area of interest (AOI) detector configured to detect a scan-path of a user with respect to the image and to detect an AOI of the user with respect to the image using the detected scan-path;
an object recognizer configured to recognize a plurality of objects on the received image;
a recognition determiner configured to compare the detected AOI and the plural detected objects to determine whether the user recognizes the plural objects; and
an outputter configured to display information about an object that is not recognized by the user according to a determination result, wherein the object recognizer comprises:
an image information extractor configured to extract at least one piece of image information of luminance, edge, symmetry, and complementary color of the received image;
a center-surround difference (CSD) processor configured to perform center-surround difference (CSD) and normalization processes on the extracted image information to output at least one of a luminance feature map, a direction feature map, a symmetry feature map, and a color feature map;
an independent component analysis (ICA) processor configured to perform independent component analysis (ICA) on the output feature map to generate a salient map (SM); and
an extractor configured to recognize a salient area on the salient map (SM) as an object.

26. A user recognition enhancing apparatus comprising:
an inputter configured to receive an image displayed to a user;
an area of interest (AOI) detector configured to detect a scan-path of a user with respect to the image and to detect an AOI of the user with respect to the image using the detected scan-path;
an object recognizer configured to recognize a plurality of objects on the received image;
a recognition determiner configured to compare the detected AOI and the plural detected objects to determine whether the user recognizes the plural objects; and
an outputter configured to display information about an object that is not recognized by the user according to a determination result, wherein the object recognizer detects a plurality of objects in the received image using incremental hierarchical MAX (IHMAX).

27. A user recognition enhancing apparatus comprising:
an inputter configured to receive an image displayed to a user;
an area of interest (AOI) detector configured to detect a scan-path of a user with respect to the image and to detect an AOI of the user with respect to the image using the detected scan-path;
an object recognizer configured to recognize a plurality of objects on the received image;
a recognition determiner configured to compare the detected AOI and the plural detected objects to determine whether the user recognizes the plural objects; and
an outputter configured to display information about an object that is not recognized by the user according to a determination result, wherein:
the object recognizer recognizes a plurality of objects on the received image in real time; and
the recognition determiner determines a newly detected object or an object with variation among the plural recognized objects, and determines the newly detected object or the object with variation, which is not contained in the detected AOI, as a non-mapped object.

28. A user recognition enhancing method of a user recognition enhancing apparatus, comprising:
receiving an image displayed to a user;
detecting a scan-path of a user with respect to the image;
detecting an area of interest (AOI) of the user with respect to the image using the detected scan-path;
recognizing a plurality of objects on the received image;
comparing the detected AOI and the plural detected objects to determine whether the user recognizes the plural objects; and
displaying information about an object that is not recognized by the user according to a determination result,
wherein, when a gaze falls on a specific area of the image for a predetermined time and the number of times a gaze re-falls on the specific area exceeds a predetermined number, detecting of the AOI comprises detecting the specific area as an AOI of the user with respect to the image.

29. The user recognition enhancing method as claimed in claim 28, wherein the detecting of the AOI comprises extracting gaze feature information from the detected scan-path and detecting the AOI of the user using the extracted gaze feature information.

30. The user recognition enhancing method as claimed in claim 29, wherein the gaze feature information comprises at least one piece of information of user pupil change, eye blinking, a gaze point, a path of a gaze point, time when a gaze falls on the same area, and the number of times a gaze falls on the same area.

31. A user recognition enhancing method of a user recognition enhancing apparatus, comprising:
receiving an image displayed to a user;
detecting a scan-path of a user with respect to the image;
detecting an area of interest (AOI) of the user with respect to the image using the detected scan-path;
recognizing a plurality of objects on the received image;
comparing the detected AOI and the plural detected objects to determine whether the user recognizes the plural objects; and
displaying information about an object that is not recognized by the user according to a determination result,
wherein the recognizing comprises:
extracting at least one piece of image information of luminance, edge, symmetry, and complementary color of the received image;
performing center-surround difference (CSD) and normalization processes on the extracted image information to output at least one of a luminance feature map, a direction feature map, a symmetry feature map, and a color feature map;

performing independent component analysis (ICA) on the output feature map to generate a salient map (SM); and recognizing a salient area on the salient map (SM) as an object.

32. A user recognition enhancing method of a user recognition enhancing apparatus, comprising:

receiving an image displayed to a user;

detecting a scan-path of a user with respect to the image;

detecting an area of interest (AOI) of the user with respect to the image using the detected scan-path;

recognizing a plurality of objects on the received image;

comparing the detected AOI and the plural detected objects to determine whether the user recognizes the plural objects; and displaying information about an object that is not recognized by the user according to a determination result, wherein the recognizing comprises detecting a plurality of objects in the received image using incremental hierarchical MAX (IHMAX).

33. A user recognition enhancing method of a user recognition enhancing apparatus, comprising:

receiving an image displayed to a user;

detecting a scan-path of a user with respect to the image;

detecting an area of interest (AOI) of the user with respect to the image using the detected scan-path;

recognizing a plurality of objects on the received image;

comparing the detected AOI and the plural detected objects to determine whether the user recognizes the plural objects; and displaying information about an object that is not recognized by the user according to a determination result, wherein:

the recognizing comprises recognizing a plurality of objects on the received Image in real time; and the determining comprises determining a newly detected object or an object with variation among the plural recognized objects and determining the newly detected object or the object with variation, which is not contained in the detected AOI, as a non-mapped object.

\* \* \* \* \*